3,455,949
HEXAHYDROPHTHALIMIDE POLYEPOXIDE
COMPOUNDS
Daniel Porret, Binningen, Friedrich Lohse, Allschwil,
Ernst Leumann, Arlesheim, Erwin Nikles, Liestal, and
Hans Batzer, Arlesheim, Switzerland, assignors to Ciba
Limited, Basel, Switzerland, a company of Switzerland
No Drawing. Filed Mar. 16, 1966, Ser. No. 534,672
Claims priority, application Switzerland, Mar. 23, 1965,
4,044/65
Int. Cl. C07d 27/52; C09b 3/58
U.S. Cl. 260—326    5 Claims

ABSTRACT OF THE DISCLOSURE

Polyepoxy compounds of the general formula

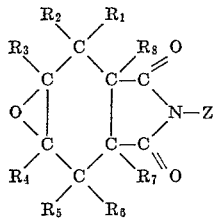

where $R_1$ to $R_8$ each represents a monovalent substituent, such as a halogen atom, an alkoxy group or an aliphatic hydrocarbon residue, preferably an alkyl group containing 1 to 4 carbon atoms, or a hydrogen atom, and $R_1+R_5$ may also represent an alkylene radical, such as a methylene group, and Z represents an aliphatic or cycloaliphatic residue which contains at least one epoxide group and is free from nitrogen can be cured in the usual manner to provide castings, moldings, laminates and the like.

---

The present invention provides new polyepoxy compounds of the general formula

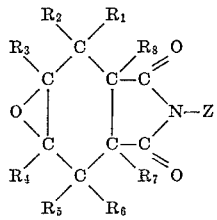

where $R_1$ to $R_8$ each represents a monovalent substituent, such as a halogen atom, an alkoxy group or an aliphatic hydrocarbon residue, preferably an alkyl group containing 1 to 4 carbon atoms, or a hydrogen atom, and $R_1+R_5$ may also represent an alkylene radical, such as a methylene group, and Z represents an aliphatic or cycloaliphatic residue which contains at least one epoxide group and is free from nitrogen.

Particularly readily accessible are the diepoxy compounds of the formula

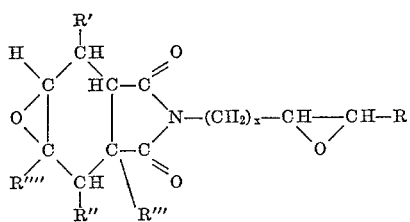

where R' and R'' each represents a hydrogen atom or R'+R'' represent the methylene group; R''' and R'''' each represent a hydrogen atom or the methyl group, R a hydrogen atom or an alkyl group, and $x$ is a whole number, preferably from 1 to 9.

Likewise readily accessible are the diepoxy compounds of the formula

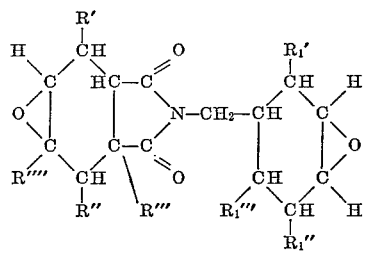

where R' and R'', and $R'_1$ and $R''_1$ respectively, each represents a hydrogen atom or together represent the methylene group, and R''', R'''' and $R'''_1$ each represents a hydrogen atom or the methyl group.

According to this invention the new polyepoxides are manufactured by reacting an epoxidizing agent in a single-stage or two-stage process upon an imide of the formula

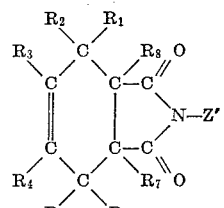

wherein the residues $R_1$ to $R_8$ have the same meanings as in Formula I and Z' represents an aliphatic or cycloaliphatic residue which contains at least one epoxide group or epoxidizable group and is free from nitrogen.

The term "residue containing an epoxidizable group" refers in the first place to residues containing epoxidizable C=C double bonds, such as an allyl, butenyl, dihydrodicyclopentadienyl or tetrahydrobenzyl residue.

The C=C double bond is epoxidized by usual methods, preferably with the aid of organic peracids, such as peracetic, perbenzoic, peradipic, monoperphthalic acid or the like. There may also be used mixtures of hydrogen peroxide with organic acids such as formic acid, or with acid anhydrides such as acetic or succinic anhydride. Another suitable epoxidizing agent is hypochlorous acid; if this acid is used HOCL is added on the double bond in a first stage and in a second stage the epoxide group is formed by treatment with an agent capable of splitting off hydrogen chloride, for example a strong alkali.

The term "residue containing an epoxidizable group" furthermore describes residues containing a halohydrin grouping

where Hal stands for a halogen atom—such as a β-methylglycerol-α-monochlorohydrin residue or a glycerol-α-monochlorohydrin residue. As is known such a halohydrin group can likewise be converted into a 1,2-epoxide group by treatment with a dehydrohalogenating agent, especially with a strong alkali, for example potassium hydroxide or sodium hydroxide.

To obtain the diepoxy compounds of the Formula II imides of the formula

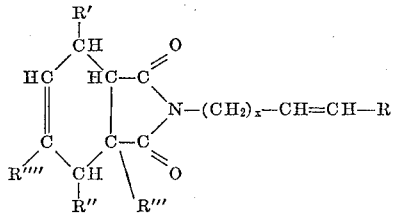

where R', R", R'", R"", R and x have the same meanings as in the Formula II—may be epoxidized.

Such imides in their turn are readily accessible by condensing tetrahydrophthalic anhydride with an unsaturated aliphatic amine, for example allylamine or oleylamine, or with an unsaturated alicyclic amine such as $\Delta^3$-tetrahydrobenzylamine, 6-methyl-$\Delta^3$-tetrahydrobenzylamine or 2,5-endomethylene-6-methyl-$\Delta^3$-tetrahydrobenzylamine.

Furthermore, the imides of the Formula V are also obtained when an alkali metal compound of tetrahydrophthalimide, such as tetrahydrophthalimide sodium, is reacted with an unsaturated aliphatic or cycloaliphatic halide, for example allyl chloride or allyl bromide.

Furthermore, when alkali metal compounds of tetrahydrophthalimide or of its homologues are reacted with a glycerol dichlorohydrin, an imide of the formula

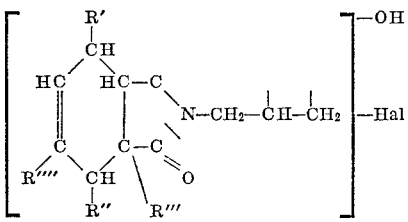

is obtained, where R', R", R'" and R"" have the same meanings as in Formula II and Hal represents a halogen atom such as chlorine or bromine; these imides can be epoxidized in either order of succession by a two-stage process, epoxidizing the cyclohexene ring in one stage for instance with peracetic acid and then converting the halohydrin group in the other stage into the epoxide group by treatment with alkali.

Alternatively, diepoxy compounds II are also obtained when monoepoxides of the formula

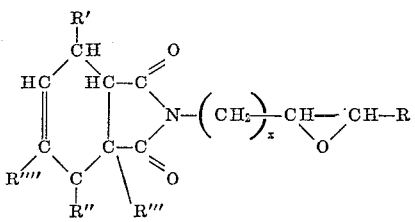

where R', R", R'", R"", R and x have the same meanings as in the Formula II—are epoxidized. Monoepoxides of the Formula VII in their turn are obtained, for example, by reacting an alkali metal imide of the formula

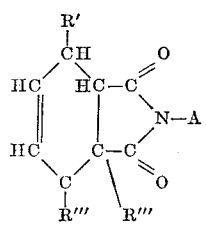

where R', R" and R'" have the above meanings and A represents an alkali metal atom, especially sodium or potassium—with a halogenepoxy compound of the formula

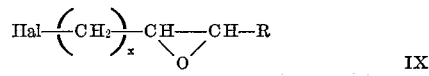

where Hal represents halogen—especially with an epihalohydrin such as epibromohydrin or epichlorohydrin.

Diepoxy compounds of the Formula III are generally manufactured by epoxidizing imides of the formula

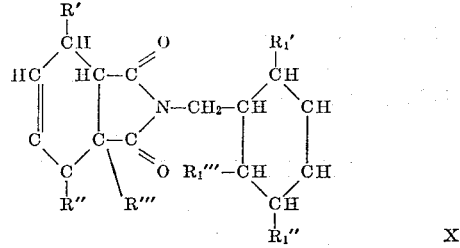

where R', R", $R_1'$, $R_1''$, R'" and $R_1'''$ have the same meanings as in Formula III.

When epoxidizing the C=C double bonds in the starting compounds of the Formula IV, V, VI, VII or X there intervene as a rule side reactions which give rise to small amounts of wholly or only partially hydrolyzed epoxides, that is to say compounds in which the epoxide groups, of the diepoxides of the Formula I, II or III have been wholly or partially split to form vicinal hydroxyl groups or esterified hydroxyl groups.

It has been observed that the presence of such by-products has in general a beneficial effect upon the technical properties of the cured diepoxides. Therefore, it is as a rule advisable to dispense with the isolation of the pure diepoxides from the reaction mixture.

As a rule the new polyepoxides of this invention are resins which are viscid at room temperature or have a low melting point and which display excellent thermostability. They may therefore be used as they are as heat stabilizers for transformer oils, hydraulic oils and for synthetic resins they may occasionally act at the same time as plasticizers.

The polyepoxides of this invention react also with the usual curing agents for epoxy compounds, so that in admixture with such curing agents they may be cross-linked or cured like other polyfunctional epoxy compounds or epoxy resins. As such curing agents there are suitable basic or especially acidic compounds.

The following have proved suitable as curing agents: Amines or amides, such as aliphatic or aromatic, primary, secondary and tertiary amines, for example para-phenylenediamine, bis - (para-aminophenyl) - methane, ethylenediamine, N,N - diethylethylenediamine, diethylenetriamine, tetra - (hydroxy - ethyl) - diethylenetriamine, triethylenetetramine, N,N-dimethyl-propylenediamine, Mannich's bases such as tris-(dimethylamino-methyl) - phenol; dicyanadiamide, urea - formaldehyde resins, melamine-formaldehyde resins; polyamides, for example those from aliphatic polyamines and dimerized or trimerized unsaturated fatty acids; polyhydric phenols, for example resorcinol, bis-(4-hydroxyphenyl)-dimethylmethane, phenol-formaldehyde resins; reaction products of aluminum alcoholates or phenolates with compounds of tautomeric reaction of the type of acetoacetic ester; Friedel-Crafts catalysts, for example aluminum chloride, antimony pentachloride, stannic chloride, zinc chloride, boron trifluoride and their complexes with organic compounds, such, for example, as boron trifluoride-amine complexes, metal fluoroborates such as zinc fluoroborate; phosphoric acid; or boroxines such as trimethoxyboroxine.

Preferably used curing agents are polybasic carboxylic acids and their anhydrides, for example phthalic, tetrahydrophthalic, hexahydrophthalic, methyl - hexahydrophthalic, endomethylene - tetrahydrophthalic, methyl-endomethylene-tetrahydrophthalic anhydride (=methyl nadic anhydride); hexachloro-endomethylene-tetrahydrophthalic, succinic, adipic, allylsuccinic, dodecenylsuccinic anhydride; 7-allyl-bicyclo (2.2.1)-hept-5-ene-2,3-dicarboxylic acid anhydride, pyromellitic acid dianhydride or mixtures of such anhydrides. Preferred use is made of curing agents that are liquid at room temperature.

If desired, there may be additionally used accelerators, such as tertiary amines, their salts or quaternary ammonium compounds, for example tris(dimethylaminomethyl)phenol, benzyldimethylamine or benzyldimethylammonium phenolate, tin (II) salts of carboxylic acids such as tin (II) octoate, or alkali metal alcoholates, for example sodium hexylate. For curing the polyepoxides of this invention with anhydrides it is advantageous to use per gram equivalent of epoxide groups 0.5 to 1.1 gram equivalent of anhydride groups.

Alternatively, the curing may be carried out in two stages; for example in the case of N-glycidyl-4,5-epoxy-hexahydrophthalimide, in the first stage the more reactive glycidyl group is cross-linked, for example with a polyamine, at room temperatures, and in a second stage the less reactive epoxide group in the cyclohexene ring is cross-linked at an elevated temperature, for example with a polycarboxylic acid anhydride.

The term "curing" as used in this context designates the conversion of the above diepoxides into insoluble and infusible, cross-linked products, and this is generally accompanied by shaping operations to form shaped products, such as castings, mouldings or laminates or flat structures such as lacquer films or cemented products.

If desired, the viscosity of the polyepoxides of this invention may be lowered by adding an active diluent thereto, such as butyl glycide, cresyl glycide or 3-vinyl-2,4-dioxaspiro (5.5)-9, 10-epoxyundecane.

Furthermore, the polyepoxides of the invention may be added as "upgraders" to other curable diepoxy or polyepoxy copounds to improve their thermostability. As such compounds there may be mentioned, for example, polyglycidyl ethers of polyhydric alcohols or especially of polyhydric phenols, such as resorcinol, bis-(4-hydroxyphenyl)-dimethylmethane (=bisphenol A) or condensation products of formaldehyde with phenols (novolaks); polyglycidyl esters of polycarboxylic acids, for example phthalic acid; aminopolyepoxides such as are obtained by dehydrohalogenating reaction products of an epihalohydrin with a primary or secondary amine, such as aniline or 4,4'-diaminodiphenylmethane; furthermore alicylic compounds containing several epoxide groups, such as vinylcyclohexene dioxide, dicyclopentadiene diepoxide, ethyleneglycol-bis(3,4-epoxy-tetrahydrodicyclopentadien-8-yl)ether, 3,4 - epoxy - tetrahydrodicyclopentadieny - 8-glycidyl ether, 3',4' - epoxy-cyclohexylmethyl - 3,4 - epoxycyclohexane-carboxylate, 3',4'-epoxy-6'-methylcyclohexylmethyl - 3,4 - epoxy-6-methylcyclohexanecarboxylate, bis(cyclopentyl)ether di-epoxide or 3-(3,4'-epoxy-cyclohexyl) - 2,4 - dioxaspiro (5.5)-9,10-epoxy-undecane.

Accordingly, the present invention provides also curable mixtures containing the diepoxides of this invention, if desired in conjunction with other diepoxy or polyepoxy compounds, as well as curing for epoxy resins, preferably anhydrides or dicarboxylic or polycarboxylic acids.

The polyepoxy compounds of this invention as well as their mixtures with other polyepoxy compounds and/or curing agents may further be admixed before being cured at any stage of the process with fillers, plasticizers, pigments, dyestuffs, flame-inhibitors or mould lubricants.

Suitable extenders and fillers are, for example, asphalt, bitumen, glass fibres, cellulose, mica, quartz meal, aluminum hydroxide, gypsum, kaolin, ground dolomite, colloidal silica having a large specific surface (AEROSIL) or metal powders such as aluminium powder.

The curable mixtures may be used in the unfilled or filled state, if desired or required in the form of solutions or emulsions, as textile adjuvants, coating compositions, laminating resins, paints, lacquers, dipping resins, casting resins, moulding compositions, pore fillers, putties, floor coverings, potting and insulating compounds for the electrical industry, adhesives and for the manufacture of such products.

The new products are used with special advantage in all cases where a high thermostability of the cured products is desired.

Percentages in the following examples are by weight.

EXAMPLE 1

(a) Manufacturing 1,2,3,6-tetrahydrophthalimide 1216 grams (8 mols) of 1,2,3,6-tetrahydrophthalic anhydride are cautiously dissolved with cooling in 1100 ml. of 27% ammonia. The reaction mixture is then concentrated and the concentrate heated to 180° C. When water no longer escapes, the melt formed is poured out over metal sheets, allowed to solidify and then ground. Yield: 1204 g.=100% of the theoritical. Melting point: 127° to 131° C. (according to the literature: 134° to 135° C.). After two recrystallizations from ethanol the product melts at 133° to 134° C.

(b) Manufacturing 1,2,3,6-tetrahydrophthalimide sodium 1208 grams (8 mols) of 1,2,3,6-tetrahydrophthalimide are added portionwise to a solution of 184 g. (8 mols) of sodium in 2½ litres of absolute ethanol, during which the imide passes into solution and at the same time the sodium compound already settles out. To finalize the reaction the batch is stirred for 1 hour at 60° C. with exclusion of moisture, then allowed to cool and the precipitate is filtered off, washed with absolute ethanol and then dried for 15 hours at 50° C. under 13 mm. Hg pressure.

Yield: 1282 g. (=92.6% of the theoretical) of the colourless sodium compound.

The purity of the product is determined by hydrolysis and titration of the sodium hydroxide formed; the product is 99.4% pure.

(c) Manufacturing N-glycidyl-1,2,3,6-tetrahydrophthalimide

A suspension of 692 g. (4 mols) of 1,2,3,6-tetrahydrophthalimide sodium in 1480 g. (16 mols) of epichlorohydrin is refluxed for 16 hours. The reaction mixture is then filtered and the filtrate concentrated, whereupon partial crystallization sets in, to yield 666 g. of a crude product, corresponding to 80.5% of the theoretical yield. The product has an epoxide equivalent of 241.5 (theoretical value: 207), corresponding to 4.15 epoxide equivalents per kg.

Recrystallization from methanol frunishes a crystalline share of 332 g. having an epoxide equivalence of 239.

(d) Manufacturing N-glycidyl-4,5-epoxy-hexahydrophthalimide 22.4 g. of sodium bicarbonate are added to a solution of 262 g. (1.28 mols) of N-glycidyl-1,2,3,6-tetrahydrophthalimide in 1300 ml. of benzene. While accurately maintaining the temperature between 28° and 30° C., if necessary with moderate cooling, 186 g. of aqueous peracetic acid 55% (=1.28 mols+5% excess) are dropped in within 2 hours. On completion of the addition the batch is then stirred for 1 hour without being cooled. Subsequent working up furnishes 200.7 g. of a partially solidified resin product containing 8.27 epoxide equivalents per kg.

EXAMPLE 2

(a) Manufacturing N-(1′,2′,5′,6′-tetrahydrobenzyl)-1,2,3,6-tetrahydrophthalimide 760.5 grams (5 mols) of 1,2,3,6-tetrahydrophthalic anhydride are added to 800 ml. of dioxan and then 555.0 g. (5 mols) of 1,2,5,6-tetrahydrobenzylamine are cautiously added. The ensuing exothermic reaction leads to complete dissolution. The reaction mixture is then concentrated and finally heated for 2 hours at 180° C. under a pressure of 0.1 mm. Hg. The resulting melt is poured over metal sheets, allowed to solidify and ground yields 1213 g., corresponding to 99% of the theoretical. Melting point: 71° to 76° C.

(b) Manufacturing N-(3′,4′-epoxy-hexahydrobenzyl)-4,5-epoxy-hexahydrophthalimide 16.8 grams of sodium bicarbonate are added to a solution of 122.5 g. (0.5 mol) of N-(1′,2′,5′,6′-tetrahydrobenzyl)-1,2,3,6-tetrahydrophthalimide in 250 ml. of benzene. Then 139 g. of aqueous peracetic acid 60% are dropped in so that the ensuing exothermic reaction raises the mixture from the initial room temperature to 40° C. The addition takes 1 hour, during which occasionally the batch is moderately cooled. The cooling is then removed and the whole allowed to react for another 3 hours, during which it returns to room temperature.

Working up furnishes 96 g. of a viscous, resinous substance containing 6.1 epoxide equivalents per kg.

EXAMPLE 3

1 epoxide equivalent of the N-glycidyl-4,5-epoxy-hexahydrophthalimide [prepared as described in Example 1(d)] is mixed with 0.8 equivalent of phthalic anhydride and sufficient dimethylformamide is added to produce a 30% solution of the mixtxure of epoxy resin+curing agent in dimethylformamide.

This solution is heated for 1 hour at 140° C., whereby the formation of a pre-adduct is caused. The solution is used for producing lacquer films; for this purpose so much solution is poured over aluminium sheets that after evaporation of the solvent a lacquer coating about 30μ thick may be expected. After 30 minutes at 150° C. the lacquer coating is dust-dry and cannot be scratched. After having been stored for 16 hours at 250° C. the lacquer coatnig displays an Erichsen indentation value of 6.5 mm.

EXAMPLE 4

(a) Manufacturing 4-methyl-1,2,3,6-tetrahydrophthalimide 332 grams (2 mols) of 4-methyl-1,2,3,6-tetrahydrophthalic acid anhydride are cautiously added to 284 g. of 24% aqueous ammonia wihch triggers an exothermic reaction and everything passes into solution. The reaction mixture is then concentrated and finally heated under a water-jet vacuum at 160° C. until even when the mixture is cautiously mixed no gas bubbles are released, which takes about 3 hours. The product is then obtained in a quantitative yield and crystallizes on cooling. Melting point from ethanol: 99° C.

*Analysis.*—$C_9H_{11}NO_2$ calculated: C, 65.44; H, 6.71; N, 8.48%. Found: C, 65.57; H, 6.68; N, 8.51%.

(b) N-glycidyl-4-methyl-1,2,3,6-tetrahydrophthalimide

A solution of 247.5 g. (1.5 mols) of 4-methyl-1,2,3,6-tetrahydrophthalimide in 2080 g. (22.5 mols) of epichlorohydrin is mixed with 2.4 g. of benzyl-trimethylammonium hydroxide. The reaction mixture is refluxed for 3½ hours and then allowed to cool to 60° C. In the course of 5 minutes 74.1 g. (=1.5 mols+20% excess) of powdered sodium hydroxide of 97% purity are then added in portions, while maintaining the temperature of the reaction mixture at 60° C. by occasional cooling. On completion of the addition the batch is stirred for another 30 minutes at 60° C., then concentrated to about one third its volume in a water-jet vacuum, filtered through diatomaceous earth (registered trade mark "Celite") and finally concentrated under a high vacuum until its weight remains constant. Yield: 362 g. of a crude product containing 4.35 epoxide equivalents per kg.

(c) N-glycidyl-4-methyl-4,5-epoxy-hexahydrophthalimide

A solution of 318 g. of the N-glycidyl-4-methyl-1,2,3,6-tetrahydrophthalimide described above in 800 g. of chloroform is mixed with 27.9 g. of sodium bicarbonate. Then 255 g. of aqueous peracetic acid 49.5% are dropped in at a rate such that the exothermic reaction maintains the reaction mixture at 33° to 35° with moderate cooling.

This addition takes 1 hour; afterwards the temperature is maintained for 2 hours at 35° C., if necessary by additional heating. For working up the reaction mixture it is neutralized at 0° to 10° C. with aqueous sodium hydroxide solution of 30% strength, then the organic phase is separated and the aqueous phase washed with chloroform. The organic phases are combined and washed with 50 ml. of mono-sodium phosphate solution of 14% strength, dried with anhydrous sodium sulphate, filtered and concentrated. Concentration until the weight remains constant gives a yield of 260.8 g. of a yellow epoxy resin containing 7.51 epoxide equivalents per kg.

EXAMPLE 5

(a) N-oleyl-1,2,3,6-tetrahydrophthalimide

A solution of 267 g. (1 mol) of oleylamine in 300 ml. of dioxan is cautiously mixed with 152 g. (1 mol) of 1,2,3,6-tetrahydrophthalic anhydride. The exothermic reaction causes the anhydride to dissolve completely and rapidly. As the reaction period is extended, the reaction mixture turns progressively darker. On completion of the addition the batch is concentrated under a water-jet vacuum initially at 50° C., and later on rising to 150° C., the heating being continued until gas bubbles are no longer released, which is the case after about 2 to 3 hours. The product is obtained in quantitative yield as a viscous oil from which on distillation at 190° to 200° C. under a pressure of 0.03 mm. Hg a light-yellow product is obtained.

*Analysis.*—$C_{26}H_{43}NO_2$ calculated: C, 77.8; H, 10.8; N, 3.5%. Found: C, 78.1; H, 11.2; N, 3.6%.

(b) N-(9′,10′-epoxy-octadecyl)-4,5-epoxy-hexahydrophthalimide 342 g. (=1.84 mols+10% excess) of 45% aqueous peracetic acid are dropped into a solution of 399.1 g. (0.92 mol) of N-oleyl-1,2,3,6-tetrahydrophthalimide in 800 ml. of toluene at a rate such that the exothermic reaction keeps the reaction mixture constantly at 40° C. with moderate cooling, which requires about 45 minutes. On completion of the addition the batch is further kept at 40° C. and the end of the exothermic reaction is watched. The cooling is then completely removed, whereupon after about 2 to 3 hours the reaction mixture cools off to room temperature.

For working up the reaction mixture it is allowed to separate into layers, the aqueous phase is separated and the organic phase washed with a mixture of saturated sodium carcarbonate solution and a small amount of sodium sulphite solution. The whole is then washed neutral with sodium chloride solution, and the organic phase is dried with anhydrous sodium sulphate and concentrated until its weight remains constant.

Yield: 417 g. of a yellow epoxy resin containing 3.92 epoxide groups per kg.

EXAMPLE 6

(a) N-glycidyl-1,2,3,6-tetrahydrophthalimide 151 grams (1 mol) of 1,2,3,6-tetrahydrophthalimide [prepared as described in Example 1(a)] are suspended in 1387.5 g. (15 mols) of epichlorohydrin, and 1.6 g.

of benzyl-trimethylammonium hydroxide are added. This reaction mixture is refluxed for 3 hours and then allowed to cool to 60° C.; 49.6 g. (=1 mol+20% excess) of powdered sodium hydroxide of 97% purity are added in small portions within 10 minutes, and the batch is then heated for 1 hour at 60° C., allowed to cool, concentrated to about one third its volume and filtered through diatomaceous earth (registered trademark "Celite"). The filtrate is concentrated until its weight remains constant. There are obtained 182 g. of a waxy product which contains 4.68 epoxide equivalents per kg.

Pure N-glycidyl-1,2,3,6-tetrahydrophthalimide is obtained by crystallizing the crude product from methanol. It melts at 76° to 77° C.

(b) N-glycidyl-4,5-epoxy-hexahydrophthalimide 124 grams of the crude N-glycidyl-1,2,3,6-tetrahydrophthalimide obtained above are dissolved in 300 g. of chloroform, 11.7 g. of sodium bicarbonate are added and then 107 g. of aqueous peracetic acid 49.5% are dropped in at a rate such that the exothermic reaction maintains the reaction mixture constantly between 33° and 35° C. with moderate cooling, which takes about 15 minutes. On completion of the exothermic reaction the batch is stirred for another 2 hours.

For working up the reaction mixture it is neutralized at 0° to 10° C. with aqueous 30% sodium hydroxide solution, the organic phase is separated and the aqueous phase is washed with chloroform. The combined organic phases are washed with 50 ml. of 14% mono-sodium phosphate solution, then dried with anhydrous sodium sulphate, filtered and concentrated until the weight remains constant. Yield: 106.8 g. of a yellowish, partially crystalline epoxy resin containing 7.81 epoxide equivalents per kg. By crystallizing it from ethanol, pure N-glycidyl-4,5-epoxy-hexahydrophthalimide is obtained, melting at 97° to 98° C.

*Analysis.*—$C_{11}H_{13}NO_4$ calculated: C, 59.18; H, 5.87%. Found: C, 59.52; H, 5.80%.

EXAMPLE 7

(a) N-allyl-1,2,3,6-tetrahydrophthalimide 152 grams (1 mol) of 1,2,3,6-tetrahydrophthalic anhydride are cautiously added to a solution of 57 g. (1 mol) of allylamine in 200 ml. of dioxyn. When the exothermic reaction has resulted in complete dissolution, the batch is concentrated under a water-jet vacuum. At the end the mixture is heated at 140° C. until gas bubbles are no longer being released; during this operation it must be ensured that no product is lost owing to evaporation. There are obtained 187.4 g. of a product which crystallizes slowly and boils at 140° C. under 0.1 mm. Hg pressure.

*Analysis.*—$C_{11}H_{13}NO_2$ calculated: C, 69.09; H, 6.85; N, 7.33%. Found: C, 68.91; H, 7.07; N, 7.37%.

(b) Epoxidation of N-allyl-1,2,3,6-tetrahydrophthalimide 175 grams (=0.94 mol+10% excess) of aqueous peracetic acid 45% are dropped into a solution of 90 g. (0.47 mol) of N-allyl-1,2,4,6-tetrahydrophathalimide in 180 ml. of toluene. The exothermic reaction heats up the reaction mixture for 5 to 7 minutes to 40° C. During the whole addition, which takes about 25 minutes, the temperature is kept constant at 40° C. by occasional cooling. On completion of the addition, after the exothermic reaction has subsided (during which the temperature should not be allowed to rise above 40 C.), the ice cooling is completely removed, whereupon after 2½ to 3 hours the reaction mixture has cooled to room temperature. For working up it is allowed to form separate layers; the organic phase is washed with saturated sodium carbonate solution containing a small amount of aqueous sodium sulfite solution, washed neutral with saturated sodium chloride solution, dried with anhydrous sodium sulphate and concentrated until a constant weight has been reached. There are obtained 48.8 g. of a light-brown epoxy resin containing 5.4 epoxide equivalents per kg.

EXAMPLE 8

1000 grams of the epoxy resin described in Example 1(d), that is N-glycidyl-4,5-epoxy-hexahydrophthalimide, containing 8.27 epoxide equivalents per kg., are mixed with 120 g. of an alcoholate prepared by reacting 8.2 of sodium with 1 kg. of 2,4-dihydroxy-3-hydroxymethylpentane and 1160 g. of hexahydrophthalic anhydride. The mixture is melted, thoroughly stirred, degassed and poured into aluminum moulds (12 x 40 x 140 mm.). The castings are then cured for 18 hours at 120° C. and for 10 hours at 160° C., whereupon the following results are obtained:

Heat distortion point according to

| | |
|---|---|
| Martens (DIN) °C | 161 |
| Flexural strength kg./mm.² | 11.2 |
| Deflection mm. | 6.5 |
| Impact strength cm. kg./cm.² | 5.7 |

EXAMPLE 9

1000 grams of the epoxy resin N-(3',4'-epoxy-hexahydrobenzyl)-4,5-epoxy-hexahydrophthalimide, described in Example 2(b), containing 6.1 epoxide equivalents per kg., are mixed with 120 g. of an alcoholate prepared by reacting 8.2 g. of sodium with 1 kg. of 2,4-dihydroxy-3-hydroxymethylpentane and 950 g. of hexahydrophthalic anhydride. The mixture is melted, thoroughly stirred and poured into aluminum moulds (12 x 40 x 140 mm.). The castings are then cured for 18 hours at 120° C. and for 10 hours at 160° C., to reveal the following data:

Heat distortion point according to

| | |
|---|---|
| Martens (DIN) °C | 160 |
| Flexural strength kg./mm.² | 7.6 |
| Deflection mm. | 4.4 |
| Impact strength cm. kg./cm.² | 6.1 |

What we claim is:

1. A compound of the formula

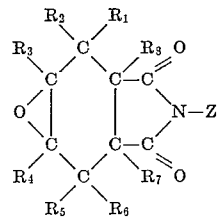

where $R_1$ to $R_8$ each are members selected from the group consisting of hydrogen atom and alkyl group containing 1 to 4 carbon atoms and together $R_1$ and $R_5$ represent the methylene group, and Z is a member selected from the group consisting of epoxy alkyl of 3 to 18 carbon atoms and epoxy cycloalkyl of 7 to 10 carbon atoms.

2. A compound according to claim 1 of the formula

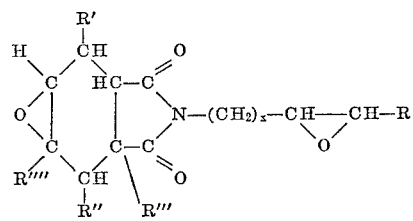

where R' and R" each represent a hydrogen atom and together R' and R" represent the methylene group; R''' and R'''' each represents a member selected from the group consisting of a hydrogen atom and the methyl group, R is a member selected from the group consisting of hydrogen atom and alkyl group, and x is a whole number from 1 to 9.

3. N-glycidyl-4,5-epoxy-hexahydrophthalimide.
4. A compound of the formula

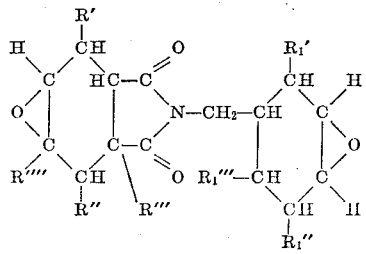

where R', R'', $R_1'$ and $R_1''$ each reresents a hydrogen atom and R' and R'', and $R_1'$ and $R_1''$ respectively together represents the methylene group, and R''', R'''' and $R_1'''$ each represents a member selected from the group consisting of hydrogen atom and the methyl group.

5. N - (3',4'-epoxy-hexahydrobenzyl)-4,5-epoxy - hexahydrophthalimide.

FOREIGN PATENTS 788,123  12/1957  Great Britain.

ALEX MAZEL, Primary Examiner

J. A. NARCAVAGE, Assistant Examiner

U.S. Cl. X.R.

117—161; 161—184; 252—64; 260—2, 9, 28, 37, 47, 57, 78.4